United States Patent
Selles et al.

(10) Patent No.: US 9,091,896 B2
(45) Date of Patent: Jul. 28, 2015

(54) ELECTROCHROMIC DEVICE WITH ANTI-IRIDESCENT COATING

(75) Inventors: Oliver Selles, Aachen (DE); Ingolf Ripberger, Bremen (DE); Philippe Letocart, Raeren (BE); Julien Orillard, Paris (FR)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 211 days.

(21) Appl. No.: 13/820,313

(22) PCT Filed: Jun. 21, 2011

(86) PCT No.: PCT/EP2011/060363
§ 371 (c)(1),
(2), (4) Date: Sep. 25, 2013

(87) PCT Pub. No.: WO2011/161110
PCT Pub. Date: Dec. 29, 2011

(65) Prior Publication Data
US 2014/0085701 A1    Mar. 27, 2014

Related U.S. Application Data

(60) Provisional application No. 61/377,109, filed on Aug. 26, 2010.

(30) Foreign Application Priority Data

Jun. 21, 2010 (FR) ...................... 10 54921

(51) Int. Cl.
*G02F 1/153* (2006.01)
*G02F 1/157* (2006.01)
(Continued)

(52) U.S. Cl.
CPC .......... *G02F 1/157* (2013.01); *B32B 17/10036* (2013.01); *B32B 17/1077* (2013.01);
(Continued)

(58) Field of Classification Search
CPC .................... B32B 17/10036; C03C 17/23

USPC ................... 359/265–275; 345/105
See application file for complete search history.

(56) References Cited

U.S. PATENT DOCUMENTS

| 4,419,386 A | 12/1983 | Gordon |
| 5,239,406 A | 8/1993 | Lynam |

(Continued)

FOREIGN PATENT DOCUMENTS

| EP | 0253713 A1 | 1/1988 |
| EP | 0382623 A1 | 8/1990 |

(Continued)

OTHER PUBLICATIONS

International Search Report for Application No. PCT/EP2011/060363 dated Sep. 22, 2011.

(Continued)

*Primary Examiner* — Tuyen Tra
(74) *Attorney, Agent, or Firm* — Abel Law Group, LLP; Robert N Young

(57) ABSTRACT

The invention relates to a device (1) of the electrochromic type comprising successively a substrate (2), a reflection control coating (8), a laminating interlayer (10), a functional system (4) of the electrochromic type and a substrate (2). This particular arrangement of the laminating interlayer between the reflection control coating and the functional system and the choice of the refractive index and thickness of the reflection control coating are such that the saturation values of C* in the colorimetric system (L*, a*, b*) of the device in reflection are less than or equal to 10 for angles of incidence of 60° and 8° relative to the normal (N) to the outer face (6B) of the counter-substrate and that the absolute value of the difference between the value of C* at an angle of incidence of 8° and the value of C* at an angle of incidence of 60° is less than or equal to 6.

28 Claims, 1 Drawing Sheet

(51) Int. Cl.
　　 *B32B 17/10* (2006.01)
　　 *C03C 17/22* (2006.01)
　　 *C03C 17/23* (2006.01)

(52) U.S. Cl.
　　 CPC ..... *B32B17/10211* (2013.01); *B32B 17/10513* (2013.01); *C03C 17/225* (2013.01); *C03C 17/23* (2013.01); *G02F 2201/38* (2013.01)

(56) References Cited

U.S. PATENT DOCUMENTS

| | | | |
|---|---|---|---|
| 5,321,544 | A | 6/1994 | Parkhe et al. |
| 5,370,775 | A | 12/1994 | Parkhe |
| 5,404,244 | A | 4/1995 | Van Dine et al. |
| 5,659,417 | A | 8/1997 | Van Dine et al. |
| 5,724,175 | A | 3/1998 | Hichwa et al. |
| 5,724,177 | A | 3/1998 | Ellis, Jr. et al. |
| 5,755,537 | A | 5/1998 | Lubbering |
| 5,825,526 | A | 10/1998 | Bommarito et al. |
| 6,502,423 | B1 | 1/2003 | Ostendarp et al. |
| 7,372,610 | B2 | 5/2008 | Burdis et al. |
| 7,710,671 | B1 | 5/2010 | Kwak et al. |
| 8,506,096 | B2 * | 8/2013 | McCabe et al. ............... 359/604 |

FOREIGN PATENT DOCUMENTS

| | | |
|---|---|---|
| EP | 0408427 A1 | 1/1991 |
| EP | 0518754 A1 | 12/1992 |
| EP | 0521602 A1 | 1/1993 |
| EP | 0532408 A1 | 3/1993 |
| EP | 0575207 A1 | 12/1993 |
| EP | 0612826 A1 | 8/1994 |
| EP | 0670346 A1 | 9/1995 |
| EP | 0825478 A1 | 2/1998 |
| EP | 0831360 A1 | 3/1998 |
| FR | 2781062 A1 | 1/2000 |
| FR | 2829723 A1 | 3/2003 |
| JP | 57-158623 A | 9/1982 |
| JP | 59-195629 A | 11/1984 |
| JP | 2010108684 A | 5/2010 |
| WO | 0003290 A1 | 1/2000 |
| WO | 02-06889 A1 | 1/2002 |
| WO | 03098339 A2 | 11/2003 |
| WO | 2005007398 A2 | 1/2005 |

OTHER PUBLICATIONS

International Search Report for Application No. PCT/EP2011/061407 dated Sep. 27, 2011.

International Search Report for Application No. PCT/EP2011/061408 dated Oct. 10, 2011.

International Written Opinion for Application No. PCT/EP2011/060363 dated Sep. 22, 2011.

International Written Opinion for Application No. PCT/EP2011/061408 dated Oct. 10, 2011.

* cited by examiner

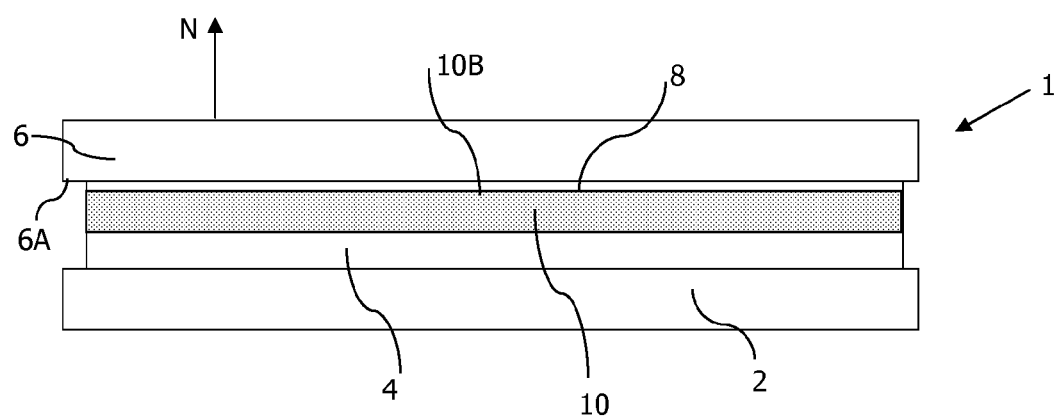

ELECTROCHROMIC DEVICE WITH ANTI-IRIDESCENT COATING

CROSS REFERENCE OF RELATED APPLICATIONS

The present application is a national phase entry under 35 U.S.C. §371 of International Application No. PCT/EP2011/060363 filed Jun. 21, 2011, published in English, which claims priority from French Patent Application No. 10/54921 filed Jun. 21, 2010, and U.S. Provisional Application No. 61/377,109 filed Aug. 26, 2010, all of which are incorporated herein by reference.

The present invention relates to the field of electrochemical devices with electrocontrollable optical and/or energy properties.

It concerns devices of which certain characteristics may be modified under the effect of a suitable electrical supply, particularly transmission, absorption, reflection in some wavelengths of electromagnetic radiation, notably in the visible and/or in the infrared, or light diffusion. The variation of transmission generally occurs in the optical region (infrared, visible, ultraviolet) and/or in other regions of electromagnetic radiation, so that the device is said to have variable optical and/or energy properties, the optical region being not necessarily the only region concerned.

As regards heat, glass panes of which transmission/absorption may be modified in at least part of the solar spectrum make it possible to control solar input inside rooms or vehicle interiors/compartments when they are mounted as external glazing of buildings or as windows of means of transport of the automobile, train, aircraft type etc and in this way preventing excessive heating of these in the case of strong sunshine.

As regards optical aspects, they enable the degree of vision to be controlled, which makes it possible to prevent dazzle when they are mounted as external glazing in the case of strong sunshine. They may also have a particularly valuable shuttering effect, both as external glazing as well as for use in interior glazing, for example for equipping interior partitions between rooms (offices in a building) or for isolating compartments in trains or aircraft for example.

Nevertheless, these devices often have the disadvantage of inducing a coloration in reflection towards the exterior.

In order to overcome this disadvantage, WO-A-00/03290 teaches the provision of a coating modifying/attenuating coloration in reflection, namely the saturation values of C* in the coloration system (L*, a*, b*), with at least one thin layer having a refractive index between 1.6 and 1.9.

As an example, WO-A-00/03290 teaches the provision, between the external substrate and the electrochromic system, of a layer of SiOC with a refractive index of 1.7 and a thickness of 50 to 55 nm. The functional system is deposited directly onto the SiOC layer and in this way in contact with the latter, which is taught as being preferred.

Nevertheless, although the coloration in reflection at normal incidence was improved, the coloration proved to persist for smaller angles of incidence, for example between 15° and 60° relative to the normal.

One object of the invention is to provide an electrochemical device with electrocontrollable optical and/or energy properties of which the coloration in reflection is relatively small, notably with the colored state of the device, and this not only for a normal angle of incidence (0°) but also for higher angles of incidence (between 15° and 60°).

To this end, the subject of the invention is a device of the type comprising:
a substrate;
an electrochemical functional system with electrocontrollable optical and/or energy properties, the functional system comprising:
a first electrode coating formed on the substrate;
a second electrode coating; and
at least one electrochemically active layer situated between the first electrode coating and the second electrode coating, at least one active electrochemical layer being capable of passing reversibly between a first state and a second state with optical and/or energy transmission properties different from the first state.
a counter-substrate designed to be disposed on the outside relative to the substrate, on the side of the incident sunlight;
a reflection control coating for attenuating/modifying the color of the device in reflection toward the outside, the reflection control coating being formed on the inner face of the counter-substrate, the reflection control system acting to reduce the saturation values of C* in the colorimetric system (L*, a*, b*) of the device in reflection;
a laminating interlayer made of polymeric material interposed between the reflection control coating and the functional system, the counter-substrate and the laminating interlayer having a refractive index between 1.4 and 1.7 and a thickness greater than 20 µm, for example greater than 100 µm, for example greater than 300 µm for the laminating interlayer and for example greater than 500 µm for the counter-substrate,
the reflection control coating having a refractive index and thickness chosen so that C* is less than or equal to 10 for angles of incidence of 60° and 8° relative to the normal to the outer face of the counter-substrate and that the absolute value of the difference between the value of C* at an angle of incidence of 8° and the value of C* at an angle of incidence of 60° is less than or equal to 6.

With the invention, the reflection control coating is surrounded by two materials (the counter-substrate and the laminating interlayer) of which the refractive index lies between 1.4 and 1.7 and of which the thickness is very much greater at wavelengths in the visible region (between 0.4 and 0.8 µm). These characteristics, in combination with a suitable choice for the refractive index and thickness of the reflection control coating have the effect of giving the least coloration of the device in reflection, notably for high angles of incidence relative to the normal.

According to particular embodiments, the device according to the invention additionally includes one or more of the technical characteristics below, taken in isolation or in all technically possible combinations:
the reflection control coating has a refractive index and a thickness chosen so that C* is less than or equal to 10 for an angle of incidence between 8° and 60° relative to the normal to the outer face of the counter-substrate;
the reflection control coating comprises a single layer of material;
the reflection control coating is in contact with the inner face of the counter-substrate;
the reflection control coating is in contact with the outer face of the laminating interlayer;
the reflection control coating comprises a layer having a refractive index of between 1.6 and 2.4, preferably between 1.75 and 2.15, preferably between 1.90 and 2.05;

the reflection control coating has a thickness of between 60 and 110 nm, preferably between 60 and 90 nm;

the reflection control coating has a coefficient of reflection greater than or equal to 10%, preferably between 12 and 25%;

the reflection control coating consists of one or more materials chosen from the following list: silicon nitride, tin oxide, silicon oxynitride, zinc oxide, aluminum nitride, tin-doped indium oxide (ITO), tin/zinc mixed oxide, titanium oxide, zinc-doped titanium oxide, silicon-doped titanium oxide or a combination of several of these materials;

the counter-substrate has a refractive index of between 1.45 and 1.60;

the laminating interlayer has a refractive index of between 1.45 and 1.60;

the laminating interlayer is a film consisting of a thermoplastic material, for example made of PU (polyurethane), PVB, acoustic PVB, EVA or SGP (DuPont SentryGlas® Plus);

the functional system is an electrochromic system, at least one electrochemically active layer being electrochromic;

the electrochromic functional system is of the solid state type.

One subject of the invention is also glazing comprising at least one sheet with a glazing function, wherein it comprises a device as described above, the substrate and the counter-substrate being sheets with a glazing function.

One object of the invention is also a method for producing a device comprising steps consisting of:

forming a first electrode coating on a substrate;

forming a second electrode coating;

forming at least one electrochemically active layer situated between the first electrode coating and the second electrode coating, at least one active electrochemical layer being capable of passing reversibly between a first state and a second state with optical transmission and/or energy properties different from the first state, forming a reflection control coating modifying/attenuating the color in reflection toward the outside, the reflection control coating being formed on the inner face of the counter-substrate, the counter-substrate being designed to be disposed on the outside relative to substrate, on the side of the incident sunlight, the reflection control system acting to reduce the saturation values of C* in the colorimetric system (L*, a*, b*) of the device in reflection;

using a laminating interlayer made of polymeric material for laminating the counter-substrate, the laminating interlayer being between the reflection control coating and the functional system, the counter-substrate and the laminating interlayer having a refractive index of between 1.4 and 1.7 and a thickness greater than 20 μm, for example greater than 100 μm, for example greater than 300 μm for the laminating interlayer and for example greater than 500 μm for the counter-substrate, the reflection control coating having a refractive index and thickness chosen so that C* is less than or equal to 10 for angles of incidence of 60° and 8° relative to the normal to the outer face of the counter-substrate and that the absolute value of the difference between the value of C* at an angle at 8° and the value of C* at an angle at 60° is less than or equal to 6.

According to particular embodiments, the production method according to the invention additionally includes one or more of the technical characteristics below, taken in isolation or in all technically possible combinations:

the reflection control coating has a refractive index and a thickness chosen so that C* is less than or equal to 10 for an angle of incidence between 8° and 60° relative to the normal to the outer face of the counter-substrate;

a single layer of material is deposited so as to form the reflection control coating;

the reflection control coating is deposited directly on the inner face of the counter-substrate;

the laminating interlayer is placed directly on the reflection control coating;

the layer forming the reflection control coating has a refractive index of between 1.6 and 2.4, preferably between 1.75 and 2.15, preferably between 1.90 and 2.0;

the reflection control coating has a thickness of between 60 and 110 nm, preferably between 60 and 90 nm;

the reflection control coating has a coefficient of reflection greater than or equal to 10%, preferably between 12 and 25%;

the layer forming the reflection control coating consists of one or more materials chosen from the following list: silicon nitride, tin oxide, silicon oxynitride, zinc oxide, aluminum nitride, tin-doped indium oxide (ITO), mixed tin/zinc oxide, titanium oxide, zinc-doped titanium oxide, silicon-doped titanium oxide or a combination of several of these materials;

the counter-substrate has a refractive index of between 1.45 and 1.60;

the laminating interlayer has a refractive index of between 1.45 and 1.60;

the laminating interlayer is a film consisting of a thermoplastic material, for example made of PU (polyurethane);

the functional system is an electrochromic system, at least electrochemically active layer being electrochromic;

the electrochromic functional system is of the solid state type.

The invention will be better understood on reading the following description, given only by way of example, made with reference to the appended drawing, in which FIG. 1 is a schematic sectional view of an electrochemical device according to the invention.

The drawing is of course not to scale, for the sake of clarity of representation, since the differences in thickness, notably between the substrate and the layers deposited are large, for example of the order of a factor of 500.

The device 1 illustrated comprises a substrate 2, a functional system 4 and a counter-substrate 6 protecting the functional system 4.

The functional system 4 is an electrochromic system, namely a system of which the transparency is controlled reversibly by the application of an electrical field, but it consists more generally of a variant of an electrochemical device with electrocontrollable optical and/or energy properties.

The functional system 4 is at least partially formed on the substrate 2, that is to say it comprises at least one layer formed on the substrate 2.

"A layer A formed (or deposited) on a layer B" is to be understood in all the text as a layer A formed either directly on the layer B and thus in contact with the layer B, or formed on the layer B with interposition of one or more layers between the layer A and the layer B.

The counter-substrate 6 is designed to protect the functional system 4. It is disposed outside relative to the substrate 2 on the side of the incident sunlight.

The device 1 additionally includes a reflection control coating 8 for attenuating/modifying the color of the device in reflection toward the outside, and a laminating interlayer 10 made of polymer, interposed between the functional system 4 and the reflection control coating 8.

The reflection control coating 8 is formed on the inner face 6A of the counter-substrate 6. It is deposited directly on the latter and in this way in contact with the inner face 6A of the counter-substrate 6.

The reflection control coating 8 has a refractive index and a thickness chosen that C* is less than or equal to 10 for angles of incidence of 60° and 8° relative to the normal N to the outer face 6B of the counter-substrate 6 and the absolute value of the difference between the value of C* at an angle of incidence of 8° and the value of C* at an angle of incidence of 60° is less than or equal to 6 (i.e. $|C*_8° - C*_{60°}| \leq 6$).

The angle of 8° is chosen to facilitate measurements, but the value of C* at this angle of incidence is very close to that which would be obtained at 0°. Measurement at 0° is in practice very difficult.

The two values of 60° and of 8° are also chosen to facilitate measurements with respect to a whole interval between 8° and 60° but the effect obtained is to have this property for all values between 8° and 60°.

The choice of the layout of the device, more particularly of the relative layout of the functional system 4, of the laminating interlayer 10 and the reflection control coating 8, has been found to enable the color in reflection to be controlled, notably for high angles of incidence relative to the normal.

The color of the device in reflection is in point of fact due to constructive interferences in reflection within a range of wavelengths, generally close to the red, giving the glazing a pinkish color, particularly at a high angle of incidence relative to the normal.

Changing the layout of the device makes it possible to obtain the desired result, in combination with a particular choice of material for the reflection control coating 8.

As explained above, the reflection control coating 8 is, with the invention, surrounded by two materials of which the refractive index lies between 1.4 and 1.7. The counter-substrate 6 and the laminating interlayer 10 have furthermore a thickness greater than 20 μm and thus very much greater than 1 μm, and thus very much greater at wavelengths in the visible region (between 0.4 and 0.8 μm). These characteristics, in combination with a suitable choice of refractive index and thickness for the reflection control coating 8, have the effect of controlling the constructive interferences in reflection and in this way of arriving at less coloration of the device 1 in reflection for angles of incidence close to the normal but also for higher angles of incidence relative to the normal.

A reflection control coating 8 is thus preferably concerned comprising a layer having a refractive index of between 1.6 and 2.4, preferably between 1.75 and 2.15, even more preferably between 1.90 and 2.05.

The reflection control coating 8 has a thickness between 60 and 100 nm, preferably between 60 and 90 nm.

It should be noted that the refractive index should be understood in all the text as the refractive index at 550 nm.

The choice of material is quite specific since, contrary to WO-A-00/03290, which optimizes the reflection control coating in order to reduce reflection (anti-reflection role) the coating according to the invention is chosen so as to reflect light in order to control constructive interferences in reflection for a wide range of angles of incidence.

The reflection control coating 8 thus has for example a coefficient of reflection greater than or equal to 14%.

The coating 8 is for example based on one or more materials chosen from the following list: silicon nitride, tin oxide, silicon oxynitride, zinc oxide, aluminum nitride, tin-doped indium oxide, mixed tin/zinc oxide, titanium oxide, zinc-doped titanium oxide, silicon-doped titanium oxide, zirconium oxide or a combination of several of these materials.

Advantageously, the coating 8 comprises a layer of $Si_3N_4$ with for example a thickness of between 60 and 90 nm.

Such a layer has a refractive index of approximately 2.02.

It should be noted that the $Si_3N_4$ layer is not necessarily stoichiometric in nitrogen, that is to say the atomic proportion of nitrogen is not necessarily 4/3. The layer is for example super-stoichiometric or sub-stoichiometric.

Advantageously, the coating 8 comprises a single layer of material, for example a single $Si_3N_4$ layer.

Advantageously, the coating 8 is in contact with the inner face 6A of the counter-substrate 6 and/or in contact with outer face 10B of the laminating interlayer 10.

The counter-substrate 6 is a sheet with a glazing function made of a material having a refractive index between 1.4 and 1.7, preferably between 1.45 and 1.60.

The sheet may be flat or curved and have any type of dimensions, notably at least one dimension greater than 1 meter.

It advantageously consists of a glass sheet.

The glass is preferably of the soda-lime-silica type, but other types of glass such a borosilicate glasses may also be used. The glass may be clear or extra-clear or tinted, for example blue, green, amber bronze or grey.

The thickness of the glass sheet is typically between 0.5 and 19 mm, notably between 2 and 12 mm, or even between 4 and 8 mm.

As a variant, the counter-substrate 6 is made of a flexible transparent material, for example of plastic.

It should be noted that the counter-substrate 6 may, as a variant, have a functional coating on all or part of its outer face 6B. It consists for example of a photocatalytic coating, for example a layer of $TiO_2$ or of a hydrophilic coating.

The laminating interlayer 10 is a film consisting of a thermoplastic material, for example made of PU (polyurethane) and has a refractive index of between 1.4 and 1.7. It can also be made in PVB, acoustic PVB, EVA or SGP (DuPont SentryGlas® Plus).

The laminating interlayer 10 typically has a thickness of between 0.3 mm and 5 mm.

The functional system 4 is advantageously an electrochromic system.

The electrochromic system is of any suitable type. It consists for example of an organic electrochromic system in which the electrochromic material is organic, a mixed electrochromic system of which the electrochromic systems are solid, more particularly of an inorganic nature, and where the electrolyte separating the electrochromic layers is organic, for example in the form of a gel or a solution, or furthermore a solid state electrochromic system in which the electrolyte is also an inorganic layer and is thus solid.

U.S. Pat. No. 5,239,406 and EP-A-0 612 826 describe for example organic electrochromic systems.

EP-0 253 713 and EP-0 670 346, EP-0 382 623, EP-0 518 754 or EP-0 532 408 describe mixed electrochromic systems.

EP-0 831 360 and WO-A-00/03290 describe solid state electrochromic systems.

As a variant however, the functional system 4 is a gasochromic system or a system that does not operate so as to give a significant variation in transmission in the visible region but in other regions of electromagnetic radiation, for example in the infrared.

Advantageously, the functional system 4 is a solid state electrochromic system. Such a system has the advantage of being durable, consisting of inorganic layers. Such a system has moreover the advantage of enabling the number of substrates to be minimized.

Conventionally, a solid state electrochromic system comprises for example:
- a first electrode coating formed on the substrate 2, for example based on tin-doped indium oxide (ITO);
- a first layer of an electrochromic material formed on the first electrode coating, based for example on tungsten oxide;
- a layer forming an electrolyte formed on the first layer of electrochromic material, based for example on tantalum oxide;
- a second layer of electrochromic material formed on the layer forming an electrolyte, based for example on nickel oxide;
- a second electrode coating formed on the second layer of electrochromic material, based for example on ITO.

Application of an electrical potential between the electrode coatings leads to an insertion of alkali ions such as $H^+$ or $Li^+$ in the first electrochromic layer and the de-insertion of ions from the second electrochromic layer, leading to a coloration of the functional system.

Application of an electrical potential with an opposite sign leads to the de-insertion of the same ions from the first electrochromic layer and to the insertion of ions in the second electrochromic layer, leading to decoloration of the system.

Such systems present the advantage of being reversible a very large number of times and for a number of years greater than 10, which enables them to be used for glazing in buildings.

It should be noted however that the nature of the functional system has no great influence on the coloration of the device in reflection. In point of fact, a coloration exists in reflection toward the outside as soon as the functional system carries an electrode coating between the outer face of the glazing and the electrochemically active layer. This is why the invention may be applied to functional systems of very varied types and is in no way limited to solid-state electrochromic systems.

The substrate 2 is a sheet acting as a glazing pane, for example a glass sheet.

In the same way as for the counter-substrate 6, the glass is preferably of the soda-lime-silica type, but other types of glass such a borosilicate glasses may also be used. The glass 2 may be clear or extra-clear or tinted, for example blue, green, amber bronze or gray. The thickness of the glass sheet is typically between 0.5 and 19 mm, notably between 2 and 12 mm, or even between 4 and 8 mm.

As a variant, the substrate 2 is made of a flexible transparent material, for example made of plastic.

EXAMPLE

The substrate 2 is a 6 mm thick sheet of soda-lime-silica glass.

The functional system 4 is a solid state electrochromic system deposited directly on the substrate 2 and consisting of the following stack, starting from the substrate 2: A 500 nm thick layer of ITO forming a first electrode coating/55 nm thick layer of iridium oxide forming a first electrochromic layer/150 nm tungsten oxide and 300 nm thick layer of tantalum oxide forming the electrolyte/400 nm thick layer of $H^+$-doped tungsten oxide forming a second electrochromic layer/100 nm thick layer of ITO forming a second electrode coating.

The laminating interlayer is in contact with the functional system 4. It consists of a 0.76 thick sheet of polyurethane.

The reflection control coating 8 is a 70 nm thick layer of $Si_3N_4$.

The reflection control coating 8 is deposited directly on the counter-substrate 6.

The laminating interlayer 10 is in contact with the reflection control coating 8.

The layout of the device 1 is therefore as follows: (outside of a building) 6 mm glass sheet/70 nm $Si_3N_4$ reflection control coating/0.76 mm polyurethane laminating interlayer/100 nm ITO/400 nm $H^+$-doped tungsten oxide/300 nm tantalum oxide/150 nm tungsten oxide/55 nm iridium oxide/500 nm thick layer of ITO/6 mm glass sheet.

The device 1 has the characteristics below in the uncolored and in the uncolored state:

TABLE 1

|  | Angle | |
| --- | --- | --- |
|  | 8° | 60° |
| UNCOLORED | | |
| $R_L$ | 16.9% | 19.6% |
| a* | −5.6 | −1.11 |
| b* | 0.6 | −0.8 |
| C* | 5.6 | 1.4 |
| Variation of C* between 8° and 60° | | 4.2 |
| COLORED | | |
| $R_L$ | 14.9% | 17.6% |
| a* | 0.7 | −0.5 |
| b* | −0.5 | −1.3 |
| C* | 0.9 | 1.4 |
| Variation of C* between 8° and 60° | | −0.5 |

$R_L$ is the light reflection coefficient. It is determined conventionally with the CIE D65 standard illuminant and the standard 2° observer.

The system (L, a*, b⁸) is conventional. It corresponds to the standard defined by CIE S 014-4/E:2007 and ISO standard 11664-4:2008(E). This system notably defines the saturation value C*.

It should be recalled that C* corresponds to the norm of the vector with coordinates (a*, b*), that is to say $$C^* = \sqrt{(a^*)^2 + (b^*)^2}$$

It should be noted that the functional stack is not limited to the one described above. Another example of a solid state electrochromic system deposited directly on the substrate 2 and consisting of the following stack, starting from the substrate 2 is:

Float glass (2.3 mm)/ZrOx or NbOx 10 nm/SiO2 30 nm/ITO (250-500 nm)/WOx 410 nm/ZrOx or NbOx 60 nm/W-NiOx 300 nm/ITO (250-500 nm)/SnO2 30 nm/SiO2 60 nm.

The subject of the invention is also glazing incorporating the device 1 according the invention. It consists for example of the following configurations for the glazing:
1. Single glazing where two glass sheets are laminated in a single glazing pane: (outside of a building) glass sheet/reflection control coating/laminating interlayer/functional system/glass sheet;
2. Double glazing where two out of three glass sheets are laminated to form a laminated glazing pane: (outside of a building) glass sheet/reflection control coating/laminating interlayer/functional system/glass sheet/space filled with a gas such a argon or krypton/low-emission coating/glass sheet (inside of building);

3. Triple glazing where two out of four sheets of glass are laminated together: (outside of a building) glass sheet/reflection control coating/laminating interlayer/functional system/glass sheet/space filled with a gas such as argon or krypton/glass sheet/space filled with a gas such as argon or krypton/low-emission coating/glass sheet (inside of building);
4. Triple glazing where two out of four glass sheets are laminated to form a laminated glazing pane: (outside of a building) glass sheet/reflection control coating/laminating interlayer/functional system/glass sheet/space filled with a gas such as argon or krypton/anti-reflection coating/glass sheet/antireflective coating/space filled with a gas such as argon or krypton/low-emission coating/glass sheet (inside of building);
5. Double glazing where two out of four glass sheets are laminated to form a laminated glazing pane: (outside of a building) glass sheet/reflection control coating/laminating interlayer/glass sheet/functional system/space filled with a gas such as argon or krypton or air or oxygen/low-emission coating—optional—/glass sheet (inside of building;
6. Triple glazing where two out of four glass sheets are laminated to form a laminated glazing pane: (outside of a building) glass sheet/reflection control coating/laminating interlayer/glass sheet/functional system/space filled with a gas such as argon or krypton or air or oxygen/glass sheet—optionally with an anti-reflection coating on each of its two faces-/space filled with a gas such as argon or krypton/low-emission coating/glass sheet (inside of building);
7. Single glazing where three glass sheets are laminated to form a laminated glazing pane: (outside of a building) glass sheet/reflection control coating/laminating interlayer/glass sheet/functional system/functional system/ glass sheet (inside of building);
8. Double glazing where three out of four glass sheets are laminated to form a laminated glazing pane: (outside of the building) glass sheet/reflection control coating/laminating interlayer/glass sheet/functional system/glass sheet/space filled with a gas such as argon or krypton/low-emission coating/glass sheet (inside of building);
9. Triple glazing where three out of five glass sheets are laminated to form a laminated glazing pane: (outside of a building) glass sheet/reflection control coating/laminating interlayer/glass sheet/functional system/glass sheet/space filled with a gas such as argon or krypton/ glass sheet/space filled with a gas such as argon or krypton/low-emission coating/glass sheet (inside of building);
10. Single glazing where two glass sheets and two plastic sheets are laminated to form a laminated glazing pane: (outside of a building) glass sheet/reflection control coating/laminating interlayer/plastic sheet/functional system/plastic sheet/laminating interlayer/glass sheet/ (inside of building);
11. Double glazing where two out of three glass sheets and two plastic sheets are laminated to form a laminated glazing pane: (outside of a building) glass sheet/reflection control coating/laminating interlayer/plastic sheet/ functional system/plastic sheet/laminating interlayer/ glass sheet/space filled with a gas such as argon or krypton/low-emission coating/glass sheet (inside of building);
12. Triple glazing where two out of five glass sheets and two plastic sheets are laminated to form a laminated glazing pane: (outside of a building) glass sheet/reflection control coating/laminating interlayer/plastic sheet/ functional system/plastic sheet/laminating interlayer/ glass sheet/space filled with a gas such as argon or krypton/glass sheet/space filled with a gas such as argon or krypton/low-emission coating/glass sheet (inside of building).

Generally, the glazing comprises a laminated glazing pane. This laminated glazing is designed to be disposed on the outside of the building.

Double glazing is understood to mean an assembly of two glazing panes spaced and separated by a gas or vacuum space and triple glazing is understood to mean an assembly of three glazing panes spaced and separated by two gas or vacuum spaces. As described above, at least one of the spaced glazing panes of multiple glazing may be laminated.

In all configurations, the glass sheet on the outside is the counter-substrate 6.

In the configurations 1 to 4, the glazing comprises a laminated glazing pane disposed on the outside and incorporating the functional system. The substrate is here the second glass sheet starting from the outside. The functional system is for example a solid state electrochromic system.

In the configurations 5 and 6, the functional system is formed on the inner face of the laminated glazing, namely the face turned toward the inside. The functional system is separated from the following glass sheet by a gas space. The functional system is for example a solid state electrochromic system. The substrate is the second glass sheet starting from the outside.

In the configurations 7 to 12, the functional system is formed on two substrates. It consists for example of a mixed or all organic electrochromic system. In these two cases, the first electrode coating of the functional system is formed on the first substrate and the second electrode coating of the functional system is formed on the second substrate. The second and third sheets acting as glazing panes and starting from the outside are here the first substrate and the second substrate respectively.

It should be noted however that, as explained above, the electrochromic system included within the device according to the invention may include one or more transparent conductive coatings such as $SnO_2$:F or ITO and/or one or more conductive networks such as metal wires. The electrochemically active layer and the electrolyte layer or layers may be in the form of a gelled solution and/or a conductive polymer and/or one or more inorganic layers deposited by magnetron cathode sputtering, DVD or a sol-gel method, and this without departing from the core of the invention.

One object of the invention is also a method for producing the device.

According to the invention, the method comprises steps consisting of:
 forming the first electrode coating on the substrate;
 forming a second electrode coating;
 forming at least one electrochemically active layer designed to be situated between the first electrode coating and the second electrode coating;
 forming the reflection control coating on the inner face of counter-substrate;
 using a laminating interlayer made of polymeric material for laminating the counter-substrate, the laminating interlayer being between the reflection control coating and the functional system.

Laminating is carried out by means of the laminating interlayer. It is typically obtained by heating the device to a temperature of approximately 120° C. for 15 min, but many heating possibilities exist.

The device obtained by the method exhibits all the characteristics described above.

The invention claimed is:

1. A device comprising:
    a substrate;
    an electrochemical functional system with electrocontrollable optical and/or energy properties, the functional system comprising:
    a first electrode coating formed on the substrate;
    a second electrode coating; and
    at least one electrochemically active layer situated between the first electrode coating and the second electrode coating, at least one active electrochemical layer being capable of passing reversibly between a first state and a second state with optical and/or energy transmission properties different from the first state;
    a counter-substrate designed to be disposed on the outside relative to the substrate, on the side of the incident sunlight;
    a reflection control coating for attenuating/modifying the color of the device in reflection toward the outside, the reflection control coating being formed on the inner face of the counter-substrate, the reflection control system acting to reduce the saturation values of $C^*$ in the colorimetric system ($L^*$, $a^*$, $b^*$) of the device in reflection;
    a laminating interlayer made of polymeric material interposed between the reflection control coating and the functional system, the counter-substrate and the laminating interlayer having a refractive index between 1.4 and 1.7 and a thickness greater than 20 µm for the laminating interlayer,
    the reflection control coating having a refractive index and thickness chosen so that $C^*$ is less than or equal to 10 for angles of incidence of 60° and 8° relative to the normal (N) to the outer face of the counter-substrate and that the absolute value of the difference between the value of $C^*$ at an angle of incidence of 8° and the value of $C^*$ at an angle of incidence of 60° is less than or equal to 6.

2. The device of claim 1, wherein the reflection control coating has a refractive index and thickness chosen so that $C^*$ is less than or equal to 10 for an angle of incidence between 8° and 60° relative to the normal (N) to the outer face of the counter-substrate.

3. The device of claim 1, wherein reflection control coating comprises a single layer of material.

4. The device of claim 1, wherein the reflection control coating is in contact with the inner face of the counter-substrate.

5. The device of claim 1, wherein the reflection control coating is in contact with the outer face of the laminating interlayer.

6. The device of claim 1, wherein the reflection control coating comprises a layer having a refractive index of between 1.6 and 2.4.

7. The device of claim 6, wherein the refractive index of the reflection control coating is between 1.75 and 2.15.

8. The device of claim 6, wherein the refractive index of the reflection control coating is between 1.90 and 2.05.

9. The device of claim 6, wherein the thickness of the reflection control coating is between 60 nm and 110 nm.

10. The device of claim 6, wherein the thickness of the reflection control coating is between 60 nm and 90 nm.

11. The device of claim 1, wherein the reflection control coating has a coefficient of reflection greater than or equal to 10%.

12. The device of claim 11, wherein the reflection control coating consists of one or more materials chosen from the group consisting of silicon nitride, tin oxide, silicon oxynitride, zinc oxide, aluminum nitride, tin-doped indium oxide (ITO), tin/zinc mixed oxide, titanium oxide, zinc-doped titanium oxide, silicon-doped titanium oxide and combination thereof.

13. The device of claim 1, wherein the counter-substrate and the laminating interlayer having a refractive index of between 1.45 and 1.60.

14. The device of claim 1, wherein the laminating interlayer is a film comprising a thermoplastic material.

15. The device of claim 14, wherein the thermoplastic material is polyvinyl butyral (PVB).

16. The device of claim 14, wherein the thermoplastic material is acoustic polyvinyl butyral.

17. The device of claim 14, wherein the thermoplastic material is ethylene vinyl acetate (EVA).

18. The device of claim 14, wherein the thermoplastic material is a polymer which comprises an ionoplast interlayer.

19. The device of claim 1, wherein the functional system is an electrochromic system, and wherein at least one electrochemically active layer being electrochromic.

20. The device of claim 19, wherein the electrochromic functional system is of a solid state type.

21. A glazing pane comprising at least one sheet with a glazing function, wherein the glazing comprises the device of claim 1.

22. The device of claim 1, wherein the thickness of the laminating interlayer is greater than 100 µm.

23. The device of claim 1, wherein the thickness of the laminating interlayer is greater than 300 µm.

24. The device of claim 1, wherein the thickness of the counter-substrate is greater than 100 µm.

25. A method for producing a device, comprising the steps of:
    forming a first electrode coating on a substrate;
    forming a second electrode coating;
    forming at least one electrochemically active layer designed to be situated between the first electrode coating and the second electrode coating, at least one electrochemically active layer being capable of passing reversibly between a first state and a second state with optical transmission and/or energy properties different from the first state,
    forming a reflection control coating for modifying/attenuating the color of the device in reflection toward the outside, the reflection control coating being formed on the inner face of a counter-substrate, the counter-substrate being designed to be disposed on the outside relative to substrate, on the side of the incident sunlight, the reflection control coating acting to reduce the saturation values of $C^*$ in the colorimetric system ($L^*$, $a^*$, $b^*$) of the device in reflection;
    using a laminating interlayer made of polymeric material for laminating the counter-substrate, the laminating interlayer being between the reflection control coating and the functional system, the counter-substrate and the laminating interlayer having a refractive index of between 1.4 and 1.7 and a thickness greater than 20 µm,
    the reflection control coating having a refractive index and thickness chosen so that $C^*$ is less than or equal to 10 for angles of incidence of 60° and 8° relative to the normal (N) to the outer face of the counter-substrate and that the absolute value of the difference between the value of $C^*$ at an angle of incidence of 8° and the value of $C^*$ at an angle of incidence of 60° is less than or equal to 6.

26. The method of claim 25, wherein the thickness of the laminating interlayer is greater than 100 µm.

27. The method of claim 25, wherein the thickness of the laminating interlayer is greater than 300 µm.

28. A device comprising:
- a substrate;
- an electrochemical functional system with electrocontrollable optical and/or energy properties, the functional system comprising:
- a first electrode coating formed on the substrate;
- a second electrode coating; and
- at least one electrochemically active layer situated between the first electrode coating and the second electrode coating, at least one active electrochemical layer being capable of passing reversibly between a first state and a second state with optical and/or energy transmission properties different from the first state;
- a counter-substrate designed to be disposed on the outside relative to the substrate, on the side of the incident sunlight;
- a reflection control coating for attenuating/modifying the color of the device in reflection toward the outside, the reflection control coating being formed on the inner face of the counter-substrate the reflection control system acting to reduce the saturation values of $C^*$ in the colorimetric system ($L^*$, $a^*$, $b^*$) of the device in reflection;
- a laminating interlayer made of polymeric material interposed between the reflection control coating and the functional system, the counter-substrate and the laminating interlayer having a refractive index between 1.4 and 1.7 and a thickness greater than 20 µm for the laminating interlayer,
- wherein the reflection control coating has a refractive index and thickness chosen so that $C^*$ is less than or equal to 10 for angles of incidence of 60° and 8° relative to the normal (N) to the outer face of the counter-substrate and that the absolute value of the difference between the value of $C^*$ at an angle of incidence of 8° and the value of $C^*$ at an angle of incidence of 60° is less than or equal to 6; and
- wherein the coefficient of reflection is between 12% and 25%.

\* \* \* \* \*